US012365063B2

(12) United States Patent
Qiu

(10) Patent No.: US 12,365,063 B2
(45) Date of Patent: Jul. 22, 2025

(54) WRENCH

(71) Applicant: WENZHOU FURUISI BUILDING MATERIALS CO., LTD., Wenzhou (CN)

(72) Inventor: Chunhe Qiu, Wenzhou (CN)

(73) Assignee: WENZHOU FURUISI BUILDING MATERIALS CO., LTD., Wenzhou (CN)

( * ) Notice: Subject to any disclaimer, the term of this patent is extended or adjusted under 35 U.S.C. 154(b) by 385 days.

(21) Appl. No.: 17/945,123

(22) Filed: Sep. 15, 2022

(65) Prior Publication Data

US 2024/0066670 A1 Feb. 29, 2024

(30) Foreign Application Priority Data

Aug. 26, 2022 (CN) ......................... 202222281352.1

(51) Int. Cl.
*B25B 13/48* (2006.01)

(52) U.S. Cl.
CPC .................................. *B25B 13/481* (2013.01)

(58) Field of Classification Search
CPC ....... B25B 13/48; B25B 13/481; B25B 13/08; B25B 13/06; B25B 13/065; B25B 13/50; B25B 13/58; B25B 13/5091; B25B 23/0028; B25B 23/0035; B25F 1/04; B25G 1/043; B25G 1/063
See application file for complete search history.

(56) References Cited

U.S. PATENT DOCUMENTS

| | | | | | |
|---|---|---|---|---|---|
| 529,707 | A * | 11/1894 | Clay | B25B 13/06 81/437 |
| 2,886,998 | A * | 5/1959 | Scott | B25B 13/481 403/92 |
| 5,005,451 | A * | 4/1991 | Lee | B25B 9/00 81/487 |
| 6,502,483 | B1 * | 1/2003 | Swank | B25B 13/56 81/177.4 |
| 10,946,501 | B2 * | 3/2021 | Patil | B25B 23/0035 |
| 11,478,906 | B2 * | 10/2022 | Sheehan | B25B 13/48 |
| 11,613,881 | B2 * | 3/2023 | Nguyen | B25B 13/48 81/177.1 |
| 2002/0062719 | A1 * | 5/2002 | Friedman | B25B 13/08 81/125.1 |
| 2004/0255727 | A1 * | 12/2004 | Kovach | B25B 13/02 81/176.15 |
| 2006/0278047 | A1 * | 12/2006 | Thompson | B25B 13/04 81/124.4 |
| 2008/0034927 | A1 * | 2/2008 | Adkins | B25B 13/48 81/124.2 |
| 2011/0239830 | A1 * | 10/2011 | Abel | B25B 13/56 81/119 |

(Continued)

*Primary Examiner* — David B. Thomas

(57) ABSTRACT

The present disclosure provides a wrench, which includes a holding rod, a first mounting member and a second mounting member both arranged on the holding rod. The first mounting member defines a first wrench mouth and a second wrench mouth, and a size of the first wrench mouth is different from a size of the second wrench mouth. The second mounting member defines a third wrench mouth, and the third wrench mouth is defined along an axial direction of the holding rod. The wrench of the present disclosure has multi-functionality and is convenient to use.

18 Claims, 4 Drawing Sheets

(56) References Cited

U.S. PATENT DOCUMENTS

| | | | | |
|---|---|---|---|---|
| 2011/0247463 | A1* | 10/2011 | Yu | B25B 13/005 81/124.3 |
| 2012/0260776 | A1* | 10/2012 | Ridge | B25B 17/02 81/57.29 |
| 2014/0260829 | A1* | 9/2014 | Alfinito | B25B 23/0021 81/177.85 |
| 2017/0030396 | A1* | 2/2017 | Miner | F16B 37/045 |
| 2020/0263403 | A1* | 8/2020 | Nguyen | E03D 1/30 |
| 2021/0220973 | A1* | 7/2021 | Patil | B25F 1/04 |
| 2021/0316422 | A1* | 10/2021 | Sheehan | B25B 15/002 |
| 2023/0226669 | A1* | 7/2023 | Cho | B25B 13/58 81/124.2 |

* cited by examiner

WRENCH

FIELD

The present disclosure relates to the technical field of tools, specifically to a wrench.

BACKGROUND

Wrench is a commonly used installation tool. For example, the wrench can be used to install a faucet on a countertop. The faucet has many components (such as nut, bolt, inlet pipe, outlet pipe, air bubbler, and so on) of different sizes. So multiple different wrenches are needed to handle the components, to install the faucet on the countertop. In addition, it is usually necessary to rotate the wrench laterally to install the components. However, it is difficult to rotate the wrench at a large angle when the installation space is narrow, which causes an inconvenience. To sum up, the existing wrench has a single function and is inconvenient to use.

SUMMARY

The present disclosure provides a wrench, aiming at solving the problem that the existing wrench has a single function and is inconvenient to use.

To achieve the above purpose, the present disclosure provides a wrench, which includes a holding rod, a first mounting member and a second mounting member both arranged on the holding rod. The first mounting member defines a first wrench mouth and a second wrench mouth, and a size of the first wrench mouth is different from a size of the second wrench mouth. The second mounting member defines a third wrench mouth, and the third wrench mouth is defined along an axial direction of the holding rod.

In at least one embodiment, the first wrench mouth and/or the second wrench mouth is defined along a radial direction of the holding rod.

In at least one embodiment, a depth of the first wrench mouth is greater than a depth of the second wrench mouth; and/or the size of the first wrench mouth is greater than the size of the second wrench mouth.

In at least one embodiment, a depth of the second wrench mouth has a range of 0.6~1 cm.

In at least one embodiment, an extension direction of the first wrench mouth is perpendicular to an extension direction of the third wrench mouth; and/or an extending direction of the second wrench mouth is perpendicular to an extending direction of the third wrench mouth.

In at least one embodiment, the second wrench mouth extends through an end face of the first mounting member.

In at least one embodiment, the first mounting member defines at least one first lightening hole.

In at least one embodiment, the first mounting member and the second mounting member are respectively arranged at two ends of the holding rod.

In at least one embodiment, the first mounting member defines an opening, the wrench includes a first protrusion protruded from an inner wall of the opening, and the first protrusion and the inner wall of the opening cooperatively form the first wrench mouth.

In at least one embodiment, the first protrusion defines a fourth wrench mouth, and a size of the fourth wrench mouth is different from the sizes of the first wrench mouth and the second wrench mouth.

In at least one embodiment, a shape of the first protrusion is matched with a shape of the inner wall of the opening.

In at least one embodiment, the first protrusion is protruded with a second protrusion, and the first protrusion and the second protrusion cooperatively form the second wrench mouth.

In at least one embodiment, a shape of the second protrusion is matched with a shape of the first protrusion; and/or a height of the second protrusion is less than a depth of the first wrench mouth; and/or the first mounting member further defines at least one second lightening hole, and the second protrusion is partially received in the second lightening hole.

In at least one embodiment, the holding rod defines a first through hole extended along the axial direction of the holding rod, and the first through hole is communicated with the first wrench mouth, the second wrench mouth, and the third wrench mouth.

In at least one embodiment, a connecting portion of the first mounting member and the holding rod defines a second through hole communicated with the first through hole.

In at least one embodiment, a size of the third wrench mouth is greater than a size of the first through hole.

In at least one embodiment, the second mounting member further defines a fifth wrench mouth communicated with the third wrench mouth, and the fifth wrench mouth extends into and about a bottom wall of the third wrench mouth.

In at least one embodiment, the fifth wrench mouth is polygonal shaped, circular shaped, elliptical shaped, or irregular shaped.

In at least one embodiment, a size of the fifth wrench mouth is smaller than a size of the third wrench mouth.

In at least one embodiment, the holding rod defines a first through hole, and the first through hole is communicated with the first wrench mouth, the second wrench mouth, the third wrench mouth, and the fifth wrench mouth.

In the technical solution of the present disclosure, the wrench includes a holding rod, a first mounting member, and a second mounting member. The first mounting member defines a first wrench mouth and a second wrench mouth. The first wrench mouth and the second wrench mouth have different sizes, so as to mount components of different sizes. The second mounting member defines a third wrench mouth, and the third wrench mouth is defined along the axial direction of the holding rod. When an installation space is narrow, the wrench can be rotated at a large angle along the axial direction of the holding rod, to install the component conveniently. Therefore, the wrench of the present disclosure has multi-functionality and is convenient to use.

BRIEF DESCRIPTION OF THE DRAWINGS

Implementations of the present disclosure will now be described, by way of embodiment, with reference to the attached FIGS. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
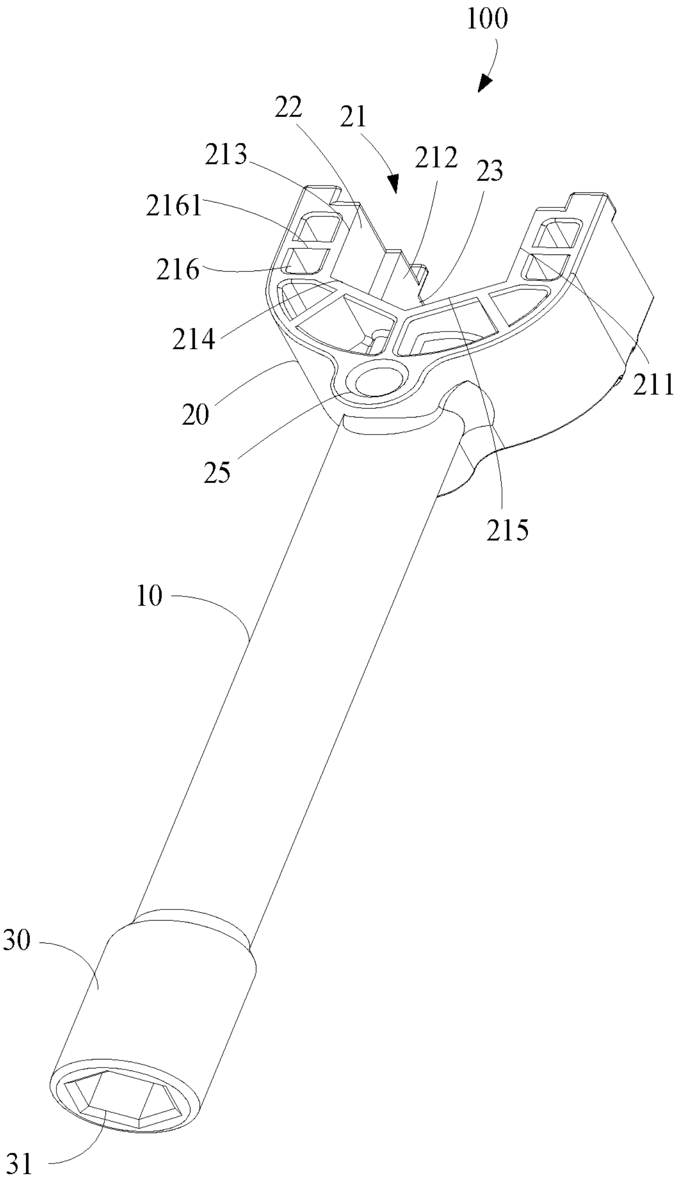
FIG. 1 is a structure diagram of a wrench according to an embodiment of the present disclosure.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different FIGS. to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the FIGS. of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
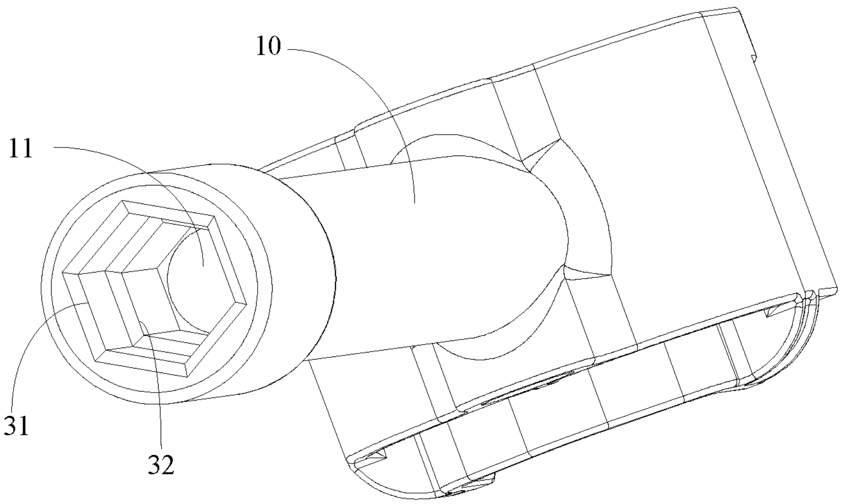
FIG. 2 is similar to FIG. 1, but shown from another view.
Figure 3:
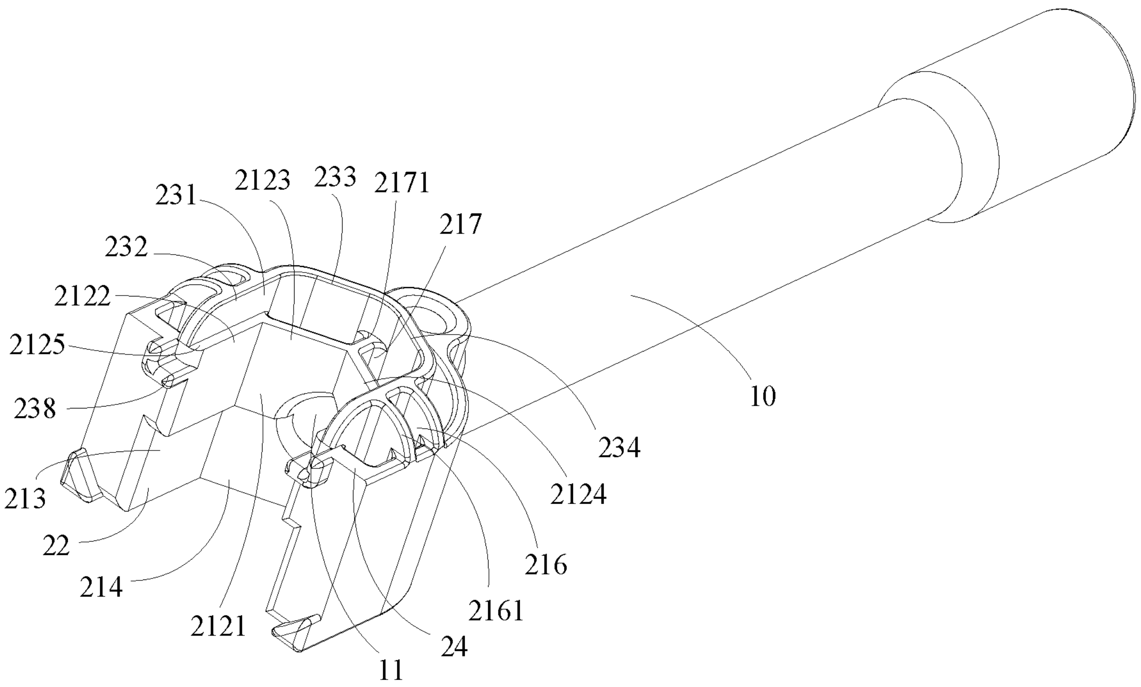
FIG. 3 is similar to FIG. 1, but shown from a further view.
Figure 4:
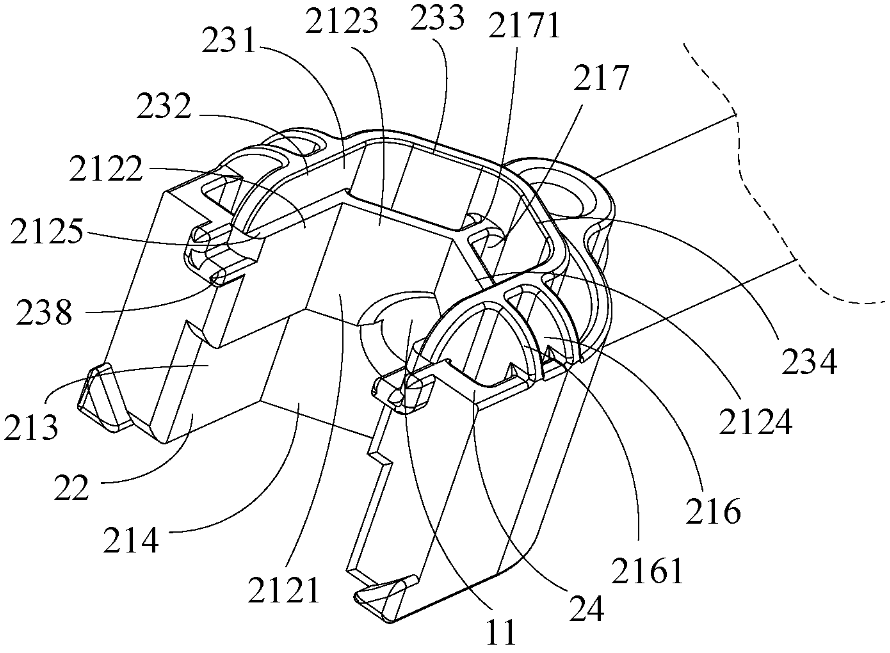
FIG. 4 is a structure diagram of parts of the wrench in FIG. 3.

Please referring to FIGS. 1 to 4, the present disclosure provides a wrench 100 according to an embodiment. The wrench 100 includes a holding rod 10, a first mounting member 20 and a second mounting member 30 both arranged on the holding rod 10. The first mounting member 20 includes a first wrench mouth 22 and a second wrench mouth 23, a size of the first wrench mouth 22 is different from a size of second wrench mouth 23. The second mounting member 30 defines a third wrench mouth 31, and the third wrench mouth 31 is defined along an axis direction of the holding rod 10.

In at least one embodiment, the holding rod 10 has a columnar structure.

In at least one embodiment, the first mounting member 20 is arranged on an end of the holding rod 10, and the second mounting member 30 is arranged on the other end of the holding rod 10.

In at least one embodiment, the size of the first wrench mouth 22 is greater than the size of the second wrench mouth 23.

In at least one embodiment, the first wrench mouth 22 and the second wrench mouth 23 are arranged opposite to each other.

In at least one embodiment, shapes of the first wrench mouth 22 and the second wrench mouth 23 can be designed to match with shapes of the components. For example, the first wrench mouth 22 and the second wrench mouth 23 each have four walls connected in sequence, to install a hexagonal nut.

In at least one embodiment, the first wrench mouth 22 is defined along a radial direction of the holding rod 10.

In at least one embodiment, the second wrench mouth 23 is defined along the radial direction of the holding rod 10.

In at least one embodiment, an extending direction of the first wrench mouth 22 is perpendicular to an extending direction of the third wrench mouth 31.

In at least one embodiment, an extending direction of the second wrench mouth 23 is perpendicular to the extending direction of the third wrench mouth 31.

In at least one embodiment, a depth of the second wrench mouth 23 has a range of 0.6~1 cm. For example, the depth of the second wrench mouth 23 is 0.6 cm, 0.7 cm, 0.8 cm, 0.9 cm, or 1 cm.

In at least one embodiment, the second wrench mouth 23 extends through an end surface 24 of the first mounting member 20, so that the second wrench mouth 23 is defined in one side of the first mounting member 20.

In at least one embodiment, the third wrench mouth 31 is polygonal shaped, circular shaped, elliptical shaped, or irregular shaped. Preferably, the third wrench mouth 31 is hexagonal shaped.

In at least one embodiment, a depth of the first wrench mouth 22 is greater than the depth of the second wrench mouth 23. The air bubbler of the faucet is relatively thin, when installing the air bubbler to an water outlet of the faucet, the air bubbler can be placed in the second wrench mouth 23 with a smaller depth, so as to install the air bubbler to the faucet easily. It should be understood that, the depth of the second wrench mouth 23 can be set to be equal to a height of the air bubbler, or slightly smaller than the height of the air bubbler.

In the technical solution of the present disclosure, the wrench 100 includes a holding rod 10, a first mounting member 20, and a second mounting member 30. The first mounting member 20 defines a first wrench mouth 22 and a second wrench mouth 23. The first wrench mouth 22 and the second wrench mouth 23 have different sizes, so as to mount components of different sizes. The second mounting member 30 defines a third wrench mouth 31, and the third wrench mouth 31 is defined along the axial direction of the holding rod 10. When an installation space is narrow, the wrench 100 can be rotated at a large angle along the axial direction of the holding rod 10, to install the component conveniently. Therefore, the wrench 100 of the present disclosure has multi-functionality and is convenient to use.

The first mounting member 20 defines an opening 21, an inner wall 211 of the opening 21 is provided with a first protrusion 212, and the first protrusion 212 and the inner wall 211 of the opening 21 cooperatively form the first wrench mouth 22.

In at least one embodiment, the inner wall 211 includes two opposite first inner walls 213, a second inner wall 214, and a third inner wall 215 connected at an angle with the second inner wall 214. The second inner wall 214 and the third inner wall 215 are respectively connected with the first inner walls 213. The first inner walls 213, the second inner wall 214, the third inner wall 215, and the first protrusion 212 cooperatively form the first wrench mouth 22. It can be understood that, four sides of the component can be located in the first wrench mouth 22, and then the wrench 100 can install the component.

In at least one embodiment, the first inner walls 213, the second inner wall 214, the third inner wall 215, and a side wall (not labeled) of the first protrusion 212 cooperatively form the first wrench mouth 22.

In at least one specific embodiment, an end of the water inlet pipe or the water outlet pipe of the faucet is provided with a hexagonal nut, and the inner walls of the first wrench mouth 22 can clamp four sides of the hexagonal nut, to install the water inlet pipe or the water outlet pipe to the faucet.

In at least one embodiment, a shape of the first protrusion 212 is matched with a shape of the inner wall 211 of the opening 21, the first protrusion 212 defines a fourth wrench mouth 2121, a size of the four wrench mouth 2121 is different from sizes of the first wrench mouth 22 and the second wrench mouth 23, so that the wrench 100 can be used to install components of different sizes.

In at least one embodiment, an end wall (not labeled) of the opening 21 defines at least one first lightening hole 216.

In at least one embodiment, the end wall defines a plurality of first lightening holes 216, and shapes of the first lightening holes 216 may be the same or different.

In at least one embodiment, a first reinforcing rib 2161 is arranged in the first lightening hole 216, and the first reinforcing rib 2161 is connected between two opposite inner walls of the first lightening hole 216, to increase a strength of the wrench 100.

In at least one embodiment, the first lightening holes 216 are defined in two opposite sides of the end wall.

In at least one embodiment, a first reinforcing rib 2161 is arranged in the first lightening hole 216, and the first reinforcing rib 2161 is connected between the inner wall of the first lightening hole 216 and an outer wall of the second wrench mouth 23.

In the technical solution of the present disclosure, the first mounting member 20 defines an opening 21, and the components of the faucet are accommodated in the wrench mouths through the opening 21. The inner wall 211 of the opening 21 is provided with a first protrusion 212, and the first protrusion 212 and the inner wall 211 of the opening 21 cooperatively form the first wrench mouth 22. The component, such as the water outlet pipe or the water inlet pipe, can be accommodated in the first wrench mouth 22, so the wrench 100 can install the component.

The first protrusion 212 is protruded with a second protrusion 231, and the first protrusion 212 and the second protrusion 231 cooperatively form the second wrench mouth 23.

In at least one embodiment, a surface of the first protrusion 212 away from the first wrench mouth 22 is protruded with the second protrusion 231.

In at least one embodiment, a shape of the second protrusion 231 is matched with a shape of the first protrusion 212.

In at least one embodiment, a height of the second protrusion 231 has a range of 0.6~1 cm. For example, the height of the second protrusion 231 is 0.6 cm, 0.7 cm, 0.8 cm, 0.9 cm, or 1 cm.

In at least one embodiment, the height of the second protrusion 231 is less than depths of the first wrench mouth 22 and the fourth wrench mouth 2121. When the second protrusion 231 is arranged on the first protrusion 212, the first protrusion 212 and the second protrusion 231 cooperatively form a step 2125, and the component can be placed on the step 2125 and retained against the step 2125, so that user can apply a force on the component through the step 2125 to install the component. Because the height of the second protrusion 231 is relatively small, some thinner component such as the air bubbler of the faucet can be placed in the second wrench mouth 23 and retained against the step 2125, and user can easily install the thinner component by the second wrench mouth 23 of the wrench 100.

In at least one embodiment, the end wall (not labeled) defines at least one second lightening hole 217, and the second protrusion 231 is partially accommodated in the second lightening hole 217. A portion of the second protrusion 231 accommodated in the second lightening hole 217 is behind the first protrusion 212, so that the component can be stably accommodated in the second wrench mouth 23.

In the technical solution of the present disclosure, the first protrusion 212 is protruded with a second protrusion 231, and the first protrusion 212 and the second protrusion 231 cooperatively form the second wrench mouth 23. The wrench 100 can be used to install the air bubbler on the faucet by the second wrench mouth 23 properly.

The holding rod 10 defines a first through hole 11 in the axial direction of the holding rod 10, and the first through hole 11 is communicated with the first wrench mouth 22, the second wrench mouth 23, and the third wrench mouth 31, and the fourth wrench mouth 2121.

In at least one embodiment, a size of the third wrench mouth 31 is greater than a size of the first through hole 11. When installing component such as a standoff, as the standoff is relatively long, a stud of the standoff can be inserted into the first through hole 11, and a nut of the standoff can be received in the third wrench mouth 31, to save the installation space.

In at least one embodiment, a connecting portion of the first mounting member 20 and the holding rod 10 defines a second through hole 25, the first through hole 11 is communicated with the second through hole 25. An extending direction of the second through hole 25 is perpendicular to an extending direction of the first through hole 11. After installing the components by the first mounting member 20 and/or the second mounting member 30, the components may be accommodated in the second through hole 25, and the components may be further tightened by rotating the wrench 100 laterally. It can be understood that, the wrench 100 can be rotated around the radial axis of the holding rod 10 to further tighten the components.

In the technical solution of the present disclosure, the holding rod 10 defines a first through hole 11 in the axial direction of the holding rod 10, the first through hole 11 is communicated with the first wrench mouth 22, the second wrench mouth 23, and the third wrench port 31. When the component such as the standoff is long, the stud of the standoff can extend into the first through hole 11, the nut of the standoff can be accommodated in the third wrench port 31, and then user can use the wrench 100 to install the component such as the standoff. Therefore, the wrench 100 can install components of different lengths.

The second mounting member 30 further defines a fifth wrench mouth 32 communicated with the third wrench mouth 31, and the fifth wrench mouth 32 is extended in and about a bottom wall of the third wrench mouth 31.

In at least one embodiment, the fifth wrench mouth 32 is polygonal shaped, circular shaped, elliptical shaped, or irregular shaped.

In at least one embodiment, a size of the fifth wrench mouth 32 is smaller than the size of the third wrench mouth 31. When installing components such as standoff, because the standoff is relatively long, the stud of the standoff can be inserted into the first through hole 11, and the nut of the standoff can be accommodated in the fifth wrench port 32 to save the installation space.

In at least one embodiment, the first through hole 11 is communicated with the first wrench mouth 22, the second wrench mouth 23, the third wrench mouth 31, and the fifth wrench mouth 32.

In the technical solution of the present disclosure, the second mounting member 30 further defines a fifth wrench mouth 32 communicated with the third wrench mouth 31, so the wrench 100 can be used to install components of different sizes and lengths.

The fourth wrench mouth 2121 includes two opposite fourth inner walls 2122, a fifth inner wall 2123 connected with one of the fourth inner walls 2122, and a sixth inner wall 2124 connected with the other fourth inner wall 2122, the fifth inner wall 2123 is connected at an included angle with the sixth inner wall 2124. The fourth inner walls 2122, the fifth inner wall 2123, and the sixth inner wall 2124 cooperatively form the fourth wrench mouth 2121.

In at least one embodiment, a size of the fourth wrench mouth 2121 is different from the sizes of the first wrench mouth 22 and the second wrench mouth 23.

In at least one embodiment, the first through hole 11 partially extends through bottom walls of the first wrench mouth 22 and the fourth wrench mouth 2121.

In at least one embodiment, the first through hole 11 partially extends through the second inner wall 214 and the third inner wall 215 of the first wrench mouth 22, and partially extends through the fifth inner wall 2123 and the sixth inner wall 2124 of the fourth wrench mouth 2121.

In at least one embodiment, the second protrusion 231 includes two opposite seventh inner walls 232, an eighth inner wall 233 connected with one of the seventh inner walls 232, and a ninth inner wall 234 connected with the other one of the seventh inner walls 232, the eighth inner wall 233 is connected at an angle with the ninth inner wall 234. The seventh inner walls 232, the eighth inner wall 233, the ninth inner wall 234, and the first protrusion 212 cooperatively form the second wrench mouth 23.

In at least one embodiment, the end wall defines at least one second lightening hole 217.

In at least one embodiment, the end wall defines a plurality of second lightening holes 217, and the second lightening holes 217 may be the same or different.

In at least one embodiment, a second reinforcing rib 2171 is arranged in the second lightening hole 217, and the second reinforcing rib 2171 is connected between the eighth inner wall 233 and the fifth inner wall 2123, or the second reinforcing rib 2171 is connected between the ninth inner wall 234 and the sixth inner wall 2124, or the second reinforcing rib 2171 is connected between a connection of the eighth inner wall 233 and the ninth inner wall 234 and another connection of the fifth inner wall 2123 and the sixth inner wall 2124.

In at least one embodiment, the first protrusion 212, the second protrusion 231, and the second reinforcing rib 2171 cooperatively form the second wrench mouth 23.

In the technical solution of the present disclosure, the first protrusion 212 defines a fourth wrench mouth 2121, so that the wrench 100 has a plurality of wrench mouths of different sizes to mount various components of the faucet.

The above description is merely some embodiments. It should be noted that for one with ordinary skills in the art, improvements can be made without departing from the concept of the present disclosure, but these improvements shall fall into the protection scope of the present disclosure.

What is claimed is:

1. A wrench, comprising:

a holding rod;

a first mounting member, arranged on the holding rod, the first mounting member defines a first wrench mouth and a second wrench mouth, and a size of the first wrench mouth is different from a size of the second wrench mouth;

a second mounting member, arranged on the holding rod, and the second mounting member defines a third wrench mouth, and the third wrench mouth is defined along an axial direction of the holding rod;

wherein each of the first wrench mouth, the second wrench mouth, and the third wrench mouth is configured to receive a nut to install the nut; and wherein the first mounting member defines at least one first lightening hole in an end surface of the first mounting member.

2. The wrench according to claim 1, wherein the first wrench mouth and/or the second wrench mouth is defined along a radial direction of the holding rod.

3. The wrench according to claim 1, wherein a depth of the first wrench mouth is greater than a depth of the second wrench mouth; and/or the size of the first wrench mouth is greater than the size of the second wrench mouth.

4. The wrench according to claim 1, wherein a depth of the second wrench mouth has a range of 0.6~1 cm.

5. The wrench according to claim 1, wherein an extension direction of the first wrench mouth is perpendicular to an extension direction of the third wrench mouth; and/or an extending direction of the second wrench mouth is perpendicular to an extending direction of the third wrench mouth.

6. The wrench according to claim 1, wherein the second wrench mouth extends through an end face of the first mounting member.

7. The wrench according to claim 1, wherein the first mounting member and the second mounting member are respectively arranged at two ends of the holding rod.

8. The wrench according to claim 1, wherein the first mounting member defines an opening, the wrench comprises a first protrusion protruded from an inner wall of the opening, and the first protrusion and the inner wall of the opening cooperatively form the first wrench mouth.

9. The wrench according to claim 8, wherein the first protrusion defines a fourth wrench mouth, and a size of the fourth wrench mouth is different from the sizes of the first wrench mouth and the second wrench mouth.

10. The wrench according to claim 8, wherein a shape of the first protrusion is matched with a shape of the inner wall of the opening.

11. The wrench according to claim 8, wherein the first protrusion is protruded with a second protrusion, and the first protrusion and the second protrusion cooperatively form the second wrench mouth.

12. The wrench according to claim 11, wherein a shape of the second protrusion is matched with a shape of the first protrusion; or a height of the second protrusion is less than a depth of the first wrench mouth; or the first mounting member further defines at least one second lightening hole, and the second protrusion is partially received in the second lightening hole.

13. The wrench according to claim 1, wherein the holding rod defines a first through hole extended along the axial direction of the holding rod, and the first through hole is communicated with the first wrench mouth, the second wrench mouth, and the third wrench mouth;

wherein a size of the third wrench mouth is greater than a size of the first through hole.

14. The wrench according to claim 13, wherein a connecting portion of the first mounting member and the holding rod defines a second through hole communicated with the first through hole.

15. A wrench, comprising:

a holding rod;

a first mounting member, arranged on the holding rod, the first mounting member defines a first wrench mouth and a second wrench mouth, and a size of the first wrench mouth is different from a size of the second wrench mouth; and a second mounting member, arranged on the holding rod, and the second mounting member defines a third wrench mouth, and the third wrench mouth is defined along an axial direction of the holding rod;

wherein the second mounting member further defines a fifth wrench mouth communicated with the third wrench mouth, and the fifth wrench mouth extends into and about a bottom wall of the third wrench mouth.

16. The wrench according to claim 15, wherein the fifth wrench mouth is polygonal shaped, circular shaped, elliptical shaped, or irregular shaped.

17. The wrench according to claim 15, wherein a size of the fifth wrench mouth is smaller than a size of the third wrench mouth.

18. The wrench according to claim 15, wherein the holding rod defines a first through hole, and the first through hole is communicated with the first wrench mouth, the second wrench mouth, the third wrench mouth, and the fifth wrench mouth.

* * * * *